Patented June 18, 1940

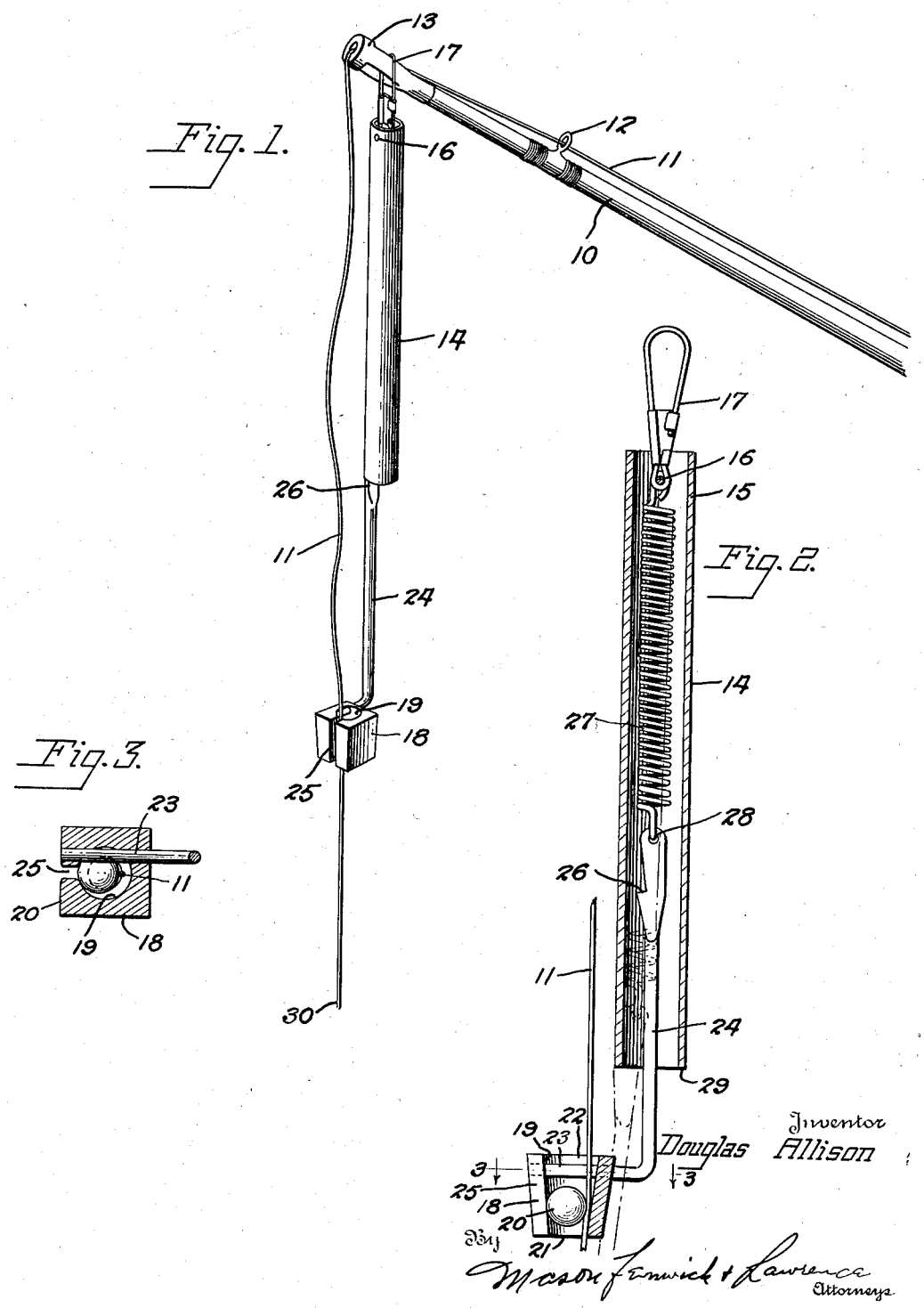

2,204,560

UNITED STATES PATENT OFFICE 2,204,560

AUTOMATIC FISH CATCHER

Douglas Allison, Fort Worth, Tex., assignor of one-half to Virgil Lowrie, Fort Worth, Tex.

Application February 4, 1939, Serial No. 254,715

8 Claims. (Cl. 43—15)

This invention relates to automatic fish catchers.

In the past it has been common practice for fishermen to leave their lines in the water while they maintain a watch over the floats of several lines, thereby detecting a bite and thereafter pulling in the fish. This is a haphazard method of fishing and is very inefficient.

One object of the present invention is to avoid the foregoing difficulties. Another object is to provide a device which will eliminate the possibility of losing a bite before the fisherman can catch the fish on the hook.

Another object is to provide a means for automatically catching the fish on the hook. Yet another object is to provide such a device which is readily detachable with respect to the fishing paraphernalia.

A further object is to provide an automatic fish catcher which can be applied to the fishing tackle without necessitating the tying of knots in the line.

Other objects and advantages of this invention will appear from the following description taken in connection with the accompanying drawing.

In the drawing; wherein like numerals represent corresponding parts in the various figures:

Figure 1 shows a device embodying the features of this invention attached to the end of a fishing pole;

Figure 2 is an enlarged cross section of the device;

Figure 3 is a transverse cross section of the automatic clutch part taken substantially on the line 3—3 of Figure 2.

Considering the drawing in greater detail, the device is shown attached to fishing tackle in Figure 1 comprising a pole 10 and a fishing line 11 passing through an eye 12 and extending through the cap 13 at the end of the rod.

The automatic fish catcher indicated generally at 14 is detachably connected to the cap 13 at one end and is engaged with the line 11 at the other end.

The device comprises a housing or barrel 15 having a transversely extending pin 16 passing through one end thereof. To the pin is connected a quick detachable member 17 of well known construction which allows the device to be quickly snapped upon the cap 13 of the fishing rod.

A one-way clutch 18 is arranged for gripping the fishing line. This clutch comprises a molded resinous member which may be of generally tapered construction, as seen in Figure 2, having a tapered passageway 19 extending therethrough in which is housed a loosely movable ball 20. The lower end 21 of the passageway is smaller than the diameter of the ball so that the latter will not fall through the opening. The enlarged upper end 22 is partly closed by means of a laterally extending portion 23 of a latch 24. Although the clutch member has been made of molded resinous material, other materials may be used to equal advantage, although the molded material is very useful in this respect. The resin may be of a transparent type so that the operation of the clutch can be observed. An elongated slot 25 arranged in the wall of the clutch allows the line 11 to be quickly inserted into the clutch and just as readily removed when that is desired.

The latch member 24 has the laterally extending portion 23 which is molded in the clutch housing or otherwise secured thereto and the main body part, provided with the latching means 26, extends upwardly and is normally retained within the housing 14. A spring 27 is connected to the latch at the point 28 on the one hand and is connected at its opposite end to the pin 16. The spring biases the latch into the position as viewed in Figure 2. The spring and latch are arranged to maintain the clutch slightly below the end of the housing so that during operation of the device, it will not strike the lower end 29 of the housing.

The operation of the device will now be readily understood. It is detachably connected at 17 to the cap of the fishing pole and the fish line is passed through the slot 25 in the clutch. The ball 20 immediately frictionally engages the fish line and upon application of a pull on the line, more particularly from the lower end 30 which is connected to the hooks, the clutch firmly grips the line and the pull trips the latch 26 off of the lower end of the housing to which it had been engaged. The spring immediately snaps the latch upward applying an instantaneous jerk to the line, thereby firmly catching the fish on the hook.

It will be readily appreciated that the device herein described can be quickly attached or detached from the fishing tackle without necessitating any tying of knots in the fish line. This is a very marked advantage which will be readily understood and appreciated by persons skilled in the art.

Although a preferred embodiment of this invention has been illustrated and described, variations within the true spirit and scope of the same will be determined by the appended claims.

What I claim is:

1. An automatic fish catcher comprising a relatively fixed housing, fish line gripping means including a one-way clutch positioned exteriorly of said housing relatively movable with respect to said housing and biased in one position, and means arranged to releasably hold said gripping means in another position against said bias.

2. An automatic fish catcher comprising a barrel adapted to be detachably connected to a fishing pole, a latched one-way clutch biased to unlatched position, and means for detachably engaging the fishing line and said clutch.

3. A readily detachable automatic fish catcher comprising a relatively fixed barrel, a one-way clutch for detachably engaging the line, yieldable means mounting said clutch in said barrel, and latch means releasably biasing the clutch against said yieldable means.

4. An automatic fish catcher comprising a relatively fixed barrel, a relatively movable one-way clutch, means releasably latching the clutch in one position, and means biasing the clutch in another position.

5. An automatic fish catcher comprising a housing, a one-way clutch, means for detachably connecting said housing to a fishing pole, spring means connecting the clutch in said housing, means for detachably connecting the fishing line to said clutch, and means for releasably biasing said clutch against the action of said spring.

6. An automatic fish catcher comprising a one-way clutch arranged to be detachably connected to a fishing pole, means for detachably engaging a fishing line with said clutch, and means for releasably biasing said clutch in one position.

7. An automatic fish catcher comprising a barrel, a snap fastener for detachably connecting said barrel to a fishing pole, gripping means including a one-way clutch for detachably engaging the fishing line, a spring secured in said barrel, and latch means inter-connecting said spring and clutch and arranged to engage said barrel to releasably bias the spring, whereby a pull on the fish line releases the latch and imparts a sharp pull on the line.

8. An automatic fish catcher comprising a barrel adapted to be detachably connected to a fishing pole, a one-way clutch adapted to be detachably connected to the fishing line, and means releasably latching said clutch in a biased position.

DOUGLAS ALLISON.